US012698370B2

(12) United States Patent
Opper et al.

(10) Patent No.: US 12,698,370 B2
(45) Date of Patent: Aug. 4, 2026

(54) HIGH DIELECTRIC CONSTANT NEAT POLYMERIC FILM

(71) Applicant: DUPONT SAFETY & CONSTRUCTION, INC., Wilmington, DE (US)

(72) Inventors: Kathleen Opper, Greenville, DE (US); Christopher Seay, Moseley, VA (US); Kevin Kaurich, Richmond, VA (US); Jacob Pretko, Richmond, VA (US)

(73) Assignee: DUPONT SAFETY & CONSTRUCTION, INC., Wilmington, DE (US)

( * ) Notice: Subject to any disclaimer, the term of this patent is extended or adjusted under 35 U.S.C. 154(b) by 119 days.

(21) Appl. No.: 18/467,191

(22) Filed: Sep. 14, 2023

(65) Prior Publication Data

US 2024/0117131 A1 Apr. 11, 2024

Related U.S. Application Data

(60) Provisional application No. 63/408,540, filed on Sep. 21, 2022.

(51) Int. Cl.
*C08J 5/18* (2006.01)

(52) U.S. Cl.
CPC ............. *C08J 5/18* (2013.01); *C08J 2377/06* (2013.01)

(58) Field of Classification Search
CPC ................................ C08J 5/18; C08J 2377/06
See application file for complete search history.

(56) References Cited

U.S. PATENT DOCUMENTS

| | | | | |
|---|---|---|---|---|
| 6,589,663 B2 * | 7/2003 | Handa | G11B 5/73937 428/221 |
| 8,497,344 B2 * | 7/2013 | Bos | C08G 69/48 528/184 |

(Continued)

FOREIGN PATENT DOCUMENTS

| | | | |
|---|---|---|---|
| CN | 110565197 A | 12/2019 | |
| WO | WO-2012097266 A1 * | 7/2012 | D02G 3/02 |

OTHER PUBLICATIONS

PCT International Search Report for Application No. PCT/US2023/074205; Cristina Steafaniu, Authorized Officer; ISA/EPO; Dec. 13, 2023.

(Continued)

*Primary Examiner* — Travis M Figg
(74) *Attorney, Agent, or Firm* — Ram W. Sabnis

(57) ABSTRACT

A polymeric film and process for making same, the film comprising residues of 5(6)-amino-2-(*p*-aminophenyl) benzimidazole, aromatic diamine, and aromatic diacid-chloride, in the form of polymer having a polymer chain including a salt of formula I, wherein C+ is a sodium, potassium, or calcium cation, the film having a thickness of about 1 to 50 micrometers, and a dielectric constant of 4.5 or greater at 2 GHz in the absence of any particulate additives that increase the dielectric constant of the film.

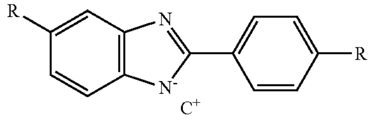

I

9 Claims, 2 Drawing Sheets

(56) References Cited

U.S. PATENT DOCUMENTS

| | | | | |
|---|---|---|---|---|
| 9,193,841 | B2 * | 11/2015 | Lee | C08J 5/18 |
| 9,362,192 | B2 * | 6/2016 | Takagi | H10W 40/778 |
| 2005/0054337 | A1 * | 3/2005 | Nobusawa | H04M 1/72415 455/352 |
| 2007/0083032 | A1 * | 4/2007 | Bos | C08G 69/32 528/310 |
| 2010/0029159 | A1 * | 2/2010 | Ishihara | C08G 73/18 264/211.12 |
| 2011/0046340 | A1 * | 2/2011 | De Vos | C08G 73/18 528/372 |
| 2013/0018148 | A1 * | 1/2013 | Knoff | D01D 10/06 524/612 |

OTHER PUBLICATIONS

Aili et al., "Understanding ternary poly(potassium benzimidasolide)-based polymer electrolytes", Polymer, vol. 84, pp. 304-310, 2016.

Longbo, et al., Ultrahigh strength and modulus copolyamide films with uniaxially cold-drawing induced molecular orientation:, High Performance Polymers 2017, vol. 29(I), pp. 58-67.

* cited by examiner

HIGH DIELECTRIC CONSTANT NEAT POLYMERIC FILM

BACKGROUND OF THE INVENTION

Field of the Invention. This invention relates to polymeric films having improved voltage resistance that are additionally suitable for addressing higher voltage requirements in automobiles, electronic devices, and other applications. Specifically, this invention relates to polymeric films having a high dielectric constant (also known as relative permittivity) and methods for making such films.

Description of Related Art. The dielectric constant or relative permittivity of an insulating material such as a film is a measure of the ability of that insulating material or film to store electric energy in an electrical field. The dielectric constant of a film is important in the design of thin film capacitors and in other devices where the film might be expected to introduce capacitance into a circuit. Films used for electrical insulation typically have a low dielectric constant, while it is desirable for films used for their capacitance, as in a capacitor, to have a high dielectric constant, allowing for thinner films to be used in the capacitor.

This invention relates to polymeric films made from polymers made by polymerizing diamines and diacids, specifically polymeric films having residues of 5(6)-amino-2-(p-aminophenyl) benzimidazole and aromatic diamine(s), and aromatic diacid-chloride(s). Various publications disclose that films and other articles can be made that have residues of paraphenylenediamine (PPD), 5(6)-amino-2-(p-aminophenyl) benzimidazole (DAPBI); and terephthaloyl dichloride (TDC). These include, for example, such publications such as U.S. Pat. No. 8,497,344 to Bos and U.S. Pat. No. 8,362,192 to De Vos, et al.; Longbo, et al. in High Performance Polymers 2017, Vol 29(I), pp. 58-67; and U.S. Pat. No. 9,193,841 to Lee.

None of these references, however, disclose or provide guidance on a polymer residue of DAPBI wherein the imidazole is in a deprotonated state, forming a salt with a cation. It has been found that polymeric films comprising polymer including residues or repeat units of DAPBI, wherein the imidazole is in a deprotonated state, have an increased dielectric constant. Polymeric films having a high dielectric constant are highly desired by the makers of automobiles and electronic devices due to their increased value per unit weight, therefore any increase in the dielectric constant of such polymeric films is high valued.

BRIEF SUMMARY OF THE INVENTION

This invention relates to a polymeric film comprising residues of 5(6)-amino-2-(p-aminophenyl) benzimidazole, aromatic diamine, and aromatic diacid-chloride, in the form of polymer having a polymer chain including a salt of formula I, wherein C+ is a sodium, potassium, or calcium cation, the film having a thickness of about 1 to 50 micrometers, and a dielectric constant of 4.5 or greater at 2 GHz in the absence of any particulate additives that increase the dielectric constant of the film.

I

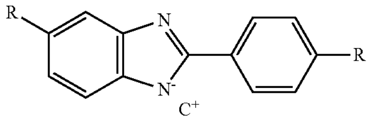

This invention also relates to a process for making a polymeric film comprising residues of 5(6)-amino-2-(p-aminophenyl) benzimidazole, aromatic diamine, and aromatic diacid-chloride, in the form of polymer having a polymer chain including a salt of formula I, wherein C+ is a sodium, potassium, or calcium cation,

I

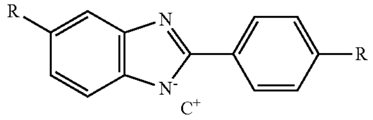

the process comprising the steps of:

a) forming an isotropic casting solution of 5(6)-amino-2-(p-aminophenyl) benzimidazole, aromatic diamine, and aromatic diacid-chloride in an organic solvent in the presence of a solubilizing salt, the isotropic casting solution having a polymer concentration of 1 to 5 weight percent, based on the total amount of polymer, solvent, and solubilizing salt in the isotropic casting solution,
b) casting a layer of isotropic casting solution onto a surface to form a cast film,
c) removing solvent from the cast film at a temperature of 35-280° C., including a step of washing the cast film with aqueous base solution having a pH of 13.8 or greater to deprotonate the imidazole and form a polymer film having a polymer chain including a polymeric imidazole salt with the base cation,
d) optionally, rinsing the film with water in a second washing step, and
e) further removing liquid from the film in a tensioned drying step, wherein the film is restrained from shrinking, at a temperature of 35 to 280° C. to form a film.

DETAILED DESCRIPTION OF THE INVENTION

This invention relates to polymeric films having residues of 5(6)-amino-2-(p-aminophenyl) benzimidazole and aromatic diamine(s), and aromatic diacid-chloride(s) that have an unexpectantly high dielectric constant that is achieved without the addition of inorganic dielectric-enhancing particles. The increase in the film's dielectric constant is achieved by the nitrogens in the benzimidazole being in a deprotonated state, the structure forming a benzimidazolide. Specifically, as used herein, a benzimidazolide is understood to be a salt wherein one of the nitrogens in the imidazole residue is the anion providing the negative charge (−) to the salt, while some other species is the cation providing the positive charge (C+) to the salt. The salt preferably comprises a sodium, potassium, or calcium cation.

The polymeric film preferably has a thickness of 1 to 50 micrometers. Films that are thicker than 50 micrometers present manufacturing issues in that typically the films are cast from solutions having a high percentage amount of solvent that must be removed. Films thinner than 1 micrometer become very difficult to manufacture; thin films can be difficult to handle and can tear easily. In some embodiments the polymeric film has a thickness of 1 to 12 micrometers, while in some other embodiments, the polymeric film has a thickness of 1 to 5 micrometers. In still other embodiments, the polymeric film has a thickness of 2 to 25 micrometers, 2 to 15 micrometers, or 2 to 5 micrometers.

The polymeric films have a dielectric constant of 4.5 or greater at 2 GHz, preferably a dielectric constant of 5.0 or greater at 2 GHz, which is advantageous because the higher dielectric constant means the films have higher capacitance.

In some embodiments the polymeric films have a dielectric constant of at least 6.0 at 2 GHz. In some embodiments, the dielectric constant is no more than 8 at 2 GHz.

The relationship between the dielectric constant of a film and its capacitance per area is represented by the equation:

$$C/A = \frac{0.2248 \times dK}{D}$$

wherein C is the capacitance in nF/in$^2$, the dielectric constant dK is unitless, A is the area of film being tested in square inches, 0.2248 is a constant with units of nF/in, and the capacitor film thickness D is measured in inches. If desired, capacitance in SI units (nF/cm$^2$) can be obtained by the relationship (nF/cm$^2$)=(nF/in$^2$)/6.45. The dielectric constant dK is unitless, as it is the ratio of the permittivity of the substance to the permittivity of the equivalent free space (air).

Figure 1:
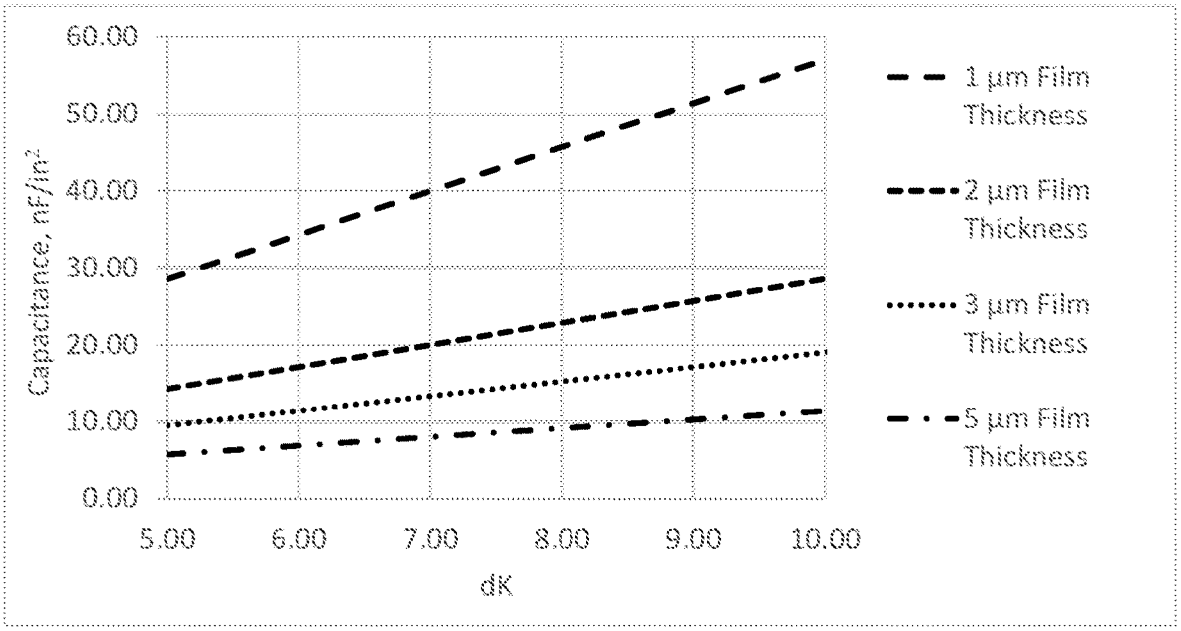
FIG. 1 is a graph of the relationship of capacitance to the dielectric constant dK for various thicknesses of film.

FIG. 1 is a graphical representation of the relationship of capacitance to the dielectric constant dK for various thicknesses of an idealized film using the above equation. For any particular film having a certain dK, thinner films have higher capacitance than thicker films. As can be appreciated from FIG. 1, the dK of the material must be increased in order to achieve thin films having higher capacitance.

The dielectric constant (dK) of any film is conveniently measured on a 25 micrometer thick sample of the film; however, the dielectric constant does not substantially differ over the claimed thickness range of about 1 to 50 micrometers.

The polymer of the polymeric film comprises residues of 5(6)-amino-2-(p-aminophenyl) benzimidazole and aromatic diamine(s), and aromatic diacid-chloride(s).

As used herein, the term "residue" of a chemical species refers to the moiety that is the resulting product of the chemical species in a particular reaction scheme or subsequent formulation or chemical product, regardless of whether the moiety is actually obtained from the chemical species. Thus, a copolymer comprising residues of paraphenylene diamine refers to a copolymer having one or more units of the formula:

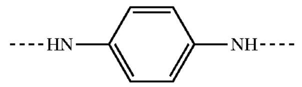

And a copolymer having residues of terephthaloyl dichloride contains one or more units of the formula:

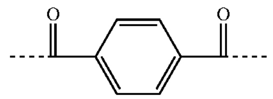

Figure 3:
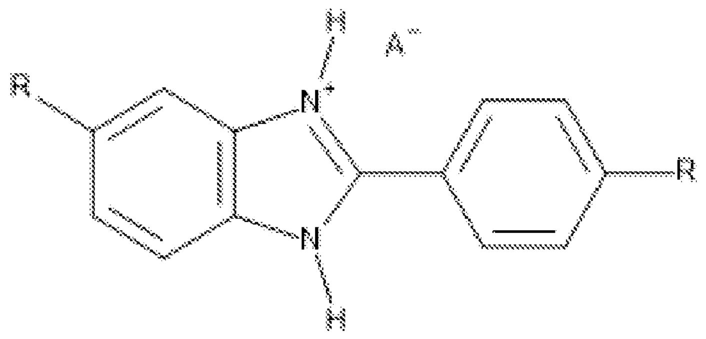
FIG. 3 is the chemical structure of a 5(6)-amino-2-(p-aminophenyl) benzimidazole residue or repeat unit in a polymer chain wherein the nitrogens in the benzimidazole are fully protonated in the form of a benzimidazolium salt.
Figure 4:
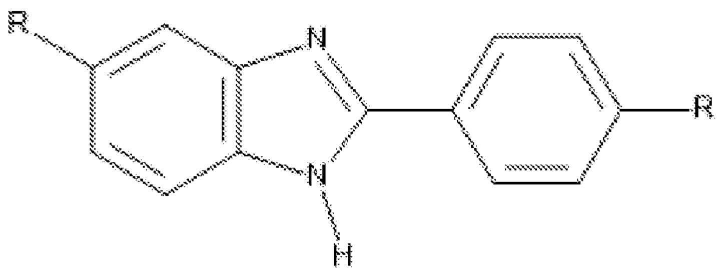
FIG. 4 is the chemical structure of a 5(6)-amino-2-(p-aminophenyl) benzimidazole residue or repeat unit in a polymer chain wherein the nitrogens in the benzimidazole are considered to be in a "neutral" state; that is, that one of the imidazole nitrogens contains a proton and the other imidazole nitrogen has a double bond since it lacks the salt designation.
Figure 5:
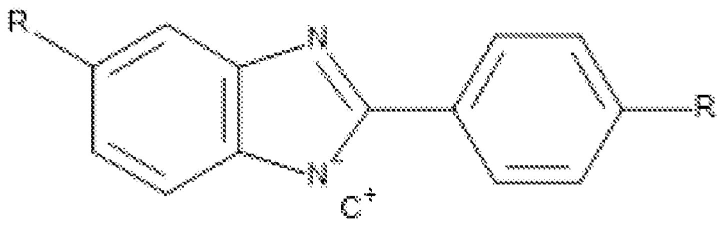
FIG. 5 is the chemical structure of a 5(6)-amino-2-(p-aminophenyl) benzimidazole residue or repeat unit in a polymer chain wherein the nitrogens in the benzimidazole are considered to be in a deprotonated state, the structure forming a benzimidazolide.

Similarly, a copolymer comprising residues of DAPBI contains one or more units as illustrated in FIGS. 3 to 5, the exact structure depending on the state of the imidazole group. For example, FIG. 3 illustrates a residue of DAPBI wherein the nitrogens in the benzimidazole are fully protonated in the form of a benzimidazolium salt. Specifically, as used herein, a benzimidazolium salt is understood to be a salt wherein one of the nitrogens in the imidazole residue is the cation providing the positive charge (+) to the salt, while some other species is the anion (A−) providing the negative charge to the salt. This is generally the case when the imidazole polymer is treated with an acid to protonate the benzimidazole and form the benzimidazolium salt.

This is also the chemical structure of the polymer directly after the polymerization of 5(6)-amino-2-(p-aminophenyl) benzimidazole and aromatic diamine(s) with aromatic diacid-chloride(s), as the polymerization creates an acid byproduct. Typically, the acid byproduct is hydrochloric acid (HCl), as a diacid chloride is normally one of the monomers. Therefore, directly after polymerization, the DAPBI residue has the chemical structure of FIG. 3 with anion "A-" being a chloride ion (Cl—) ionically bound to the imidazole ring. Washing the film with water can reduce but not eliminate the amount of ionically bound chloride. This chemical structure is also present if the polymer is recovered and subsequently solutioned in a stronger acid, such as sulfuric acid, and then shaped into a film. In that instance, "A-" anion is a sulfate ion (HSO4-) ionically bound to the imidazole ring. Washing the film with water can reduce but not eliminate the amount of ionically bound sulfate.

FIG. 4 illustrates a residue of DAPBI wherein the nitrogens in the benzimidazole are considered to be in a "neutral" state; that is, that one of the imidazole nitrogens contains a proton and the other imidazole nitrogen has a double bond since it lacks the salt designation. This is the chemical structure of the polymer after the acid byproduct created during polymerization is neutralized with a typical base.

FIG. 5 illustrates a residue of DAPBI wherein the nitrogens in the benzimidazole also form a salt, but in this instance the nitrogens are considered to be in a deprotonated state, the structure forming a benzimidazolide. Specifically, as used herein, a benzimidazolide is understood to be a salt wherein one of the nitrogens in the imidazole residue is the anion providing the negative charge (−) to the salt, while some other species is the cation (C+) providing the positive charge to the salt. This is the case when the imidazole polymer is treated with a very strong base having a very high pH to deprotonate the benzimidazole and form the benzimidazolide. A very high pH of 13.8 or preferably greater is required to create the negative charge on the imidazole. Since the strong base is typically sodium hydroxide, potassium hydroxide, calcium hydroxide or mixtures thereof, the cation (C+) on any one repeat unit can be either sodium, potassium, or calcium. It has been found that benzimidazole films, such as made from the polymer of FIG. 5, have a dielectric constant that is to 20 percent higher than neutral benzimidazole (control) films having the neutralized imidazole state as shown in FIG. 4.

The term "polymer," as used herein, means a material prepared by polymerizing monomers, end-functionalized oligomers, and/or end-functionalized polymers whether of the same or different types. The term "copolymer" as used herein refers to polymers prepared from at least two different monomers. For clarity it is understood that as used herein, the use of the word "polymer" can be used interchangeably with "copolymer" unless otherwise indicated. In some embodiments, all monomers can all be combined and reacted once to form the polymer. In some embodiments, the monomers or various amounts of the monomers can be reacted sequentially to form oligomers which can be further reacted with additional monomer(s) or oligomer(s) to form polymers. By "oligomer," it is meant polymers or species eluting out at <3000 MW with a column calibrated using polyparaphenylene diamine terephthalamide homopolymer.

As used herein, "stoichiometric amount" means the amount of a component theoretically needed to react with all of the reactive groups of a second component. For example, "stoichiometric amount" refers to the moles of terephthaloyl dichloride needed to react with substantially all of the amine groups of the amine components (paraphenylene diamine and DAPBI). It is understood by those skilled in the art that the term "stoichiometric amount" refers to a range of amounts that are typically within 10% of the theoretical amount. For example, the stoichiometric amount of terephthaloyl dichloride used in a polymerization reaction can be 90-110% of the amount of terephthaloyl dichloride theoretically needed to react with all of the paraphenylene diamine and DAPBI amine groups.

The term "organic solvent" is understood herein to include a single component organic solvent or a mixture of two or more organic solvents. In some embodiments, the organic solvent is dimethylformamide, dimethylacetamide (DMAc), N-methyl-2-pyrrolidone (NMP), or dimethylsulfoxide.

In some preferred embodiments, the organic solvent is NMP or DMAc. In some embodiments, before or during the polymerization, a solubility-enhancing agent of an inorganic salt is added in a suitable amount to enhance the solubility of the resulting polymer in the amide polar solvent. The term "inorganic salt" refers to a single inorganic salt or to a mixture of two or more inorganic salts. In some embodiments, the inorganic salt is sufficiently soluble in the solvent and liberates an ion of a halogen atom. In some embodiments, the preferred inorganic salt is potassium chloride (KCl), zinc chloride ($ZnCl_2$), lithium chloride (LiCl), or calcium chloride ($CaCl_2$). In certain preferred embodiments, the inorganic salt is LiCl or $CaCl_2$). By "solids" as used with polymer solutions, it is meant the ratio of the mass of the polymer (neutral basis) to the total mass of the solution, this is, the mass of polymer plus solvent.

The polymer comprises residues of 5(6)-amino-2-(p-aminophenyl) benzimidazole, the imidazole forming a salt with a sodium, potassium, or calcium cation; and residues of aromatic diamine and aromatic diacid-chloride.

Suitable aromatic diamines include paraphenylenediamine, 4,4'-diaminobiphenyl, 2-methyl-paraphenylene-diamine, 2-chloro-paraphenylenediamine, 2,6-naphthalenediamine, 1,5-naphthalenediamine, and 4,4'-diaminobenzanilide. In some embodiments, the preferred aromatic diamine is paraphenylenediamine.

Suitable aromatic diacid chlorides include terephthaloyl dichloride, 4,4'-benzoyl dichloride, 2-chloroterephthaloyl dichloride, 2,5-dichloroterephthaloyl chloride, 2-methyl-terephthaloyl dichloride, 2,6-naphthalenedicarboxylic acid chloride, and 1,5-naphthalenedicarboxylic acid chloride. In some embodiments, the preferred aromatic diacid is terephthaloyl dichloride.

In one preferred embodiment, the polymer comprises residues of 5(6)-amino-2-(p-aminophenyl) benzimidazole and residues of paraphenylene diamine, and terephthaloyl dichloride, the imidazole forming a salt with a sodium, potassium, or calcium cation.

In some embodiments, with regard to the residues of 5(6)-amino-2-(p-aminophenyl) benzimidazole, the imidazole forming a salt with a sodium, potassium, or calcium cation; and the residues of aromatic diamine in the polymeric film, the molar ratio of 5(6)-amino-2-(p-aminophenyl) benzimidazole to aromatic diamine is 30/70 to 85/15. In some embodiments, the molar ratio of 5(6)-amino-2-(p-aminophenyl) benzimidazole to aromatic diamine is 45/55 to 85/15. In still other embodiments, 5(6)-amino-2-(p-aminophenyl) benzimidazole is 50 mole percent or greater of the total moles of 5(6)-amino-2-(p-aminophenyl) benzimidazole and the aromatic diamine present. Preferably, the aromatic diamine is paraphenylene diamine.

Figure 2:
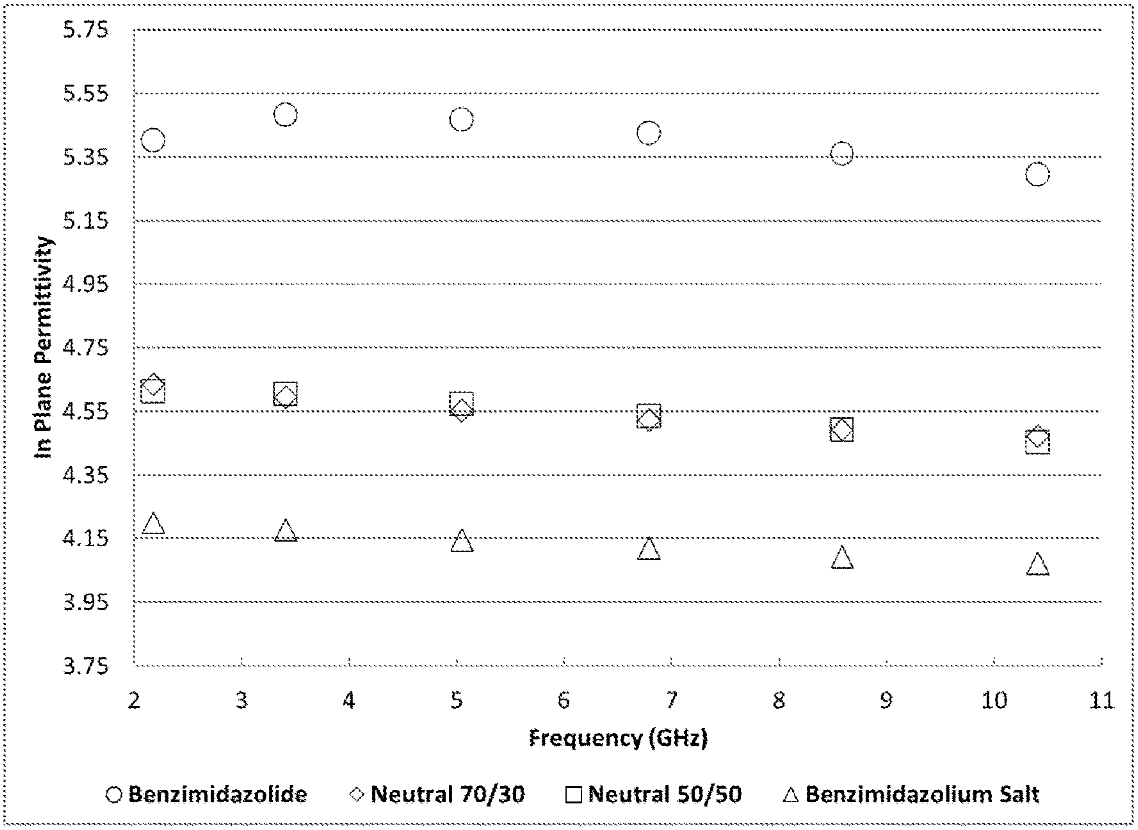
FIG. 2 is a graph illustrating the relative level of in-plane permittivity (or dielectric constant dK) is affected by the electrical state of the imidazole group in the polymer, and that dK is relatively stable over a wide degree of frequencies.

FIG. 2 illustrates the relative level of in-plane permittivity or dK of neat DABPI-containing films is unexpectedly affected by the electrical state of the imidazole group in the polymer, and that the dK is relatively stable over a wide range of frequencies. FIG. 2 illustrates that the highest relative in-plane permittivity is achieved when the polymer film comprises a DAPBI residue that is a benzimidazolide having a structure such as shown in FIG. 5; and that the lowest relative in-plane permittivity is achieved when the polymer film comprises a DAPBI residue that is a benzimidazolium salt having a structure as shown in FIG. 3. FIG. 2 further illustrates the in-plane permittivity of two other sets of data, that are polymer films comprising a DAPBI residue that is in a neutral state; that is, having a structure as shown in FIG. 4. The two sets of data provide the in-plane permittivity of a polymeric film wherein the molar ratio of 5(6)-amino-2-(p-aminophenyl) benzimidazole to aromatic diamine is 70/30 (Neutral 70/30) and a polymeric film wherein the molar ratio of 5(6)-amino-2-(p-aminophenyl) benzimidazole to aromatic diamine is 50/50 (Neutral 50/50). As shown, the in-plane permittivity or dK does not appreciably vary over this range of molar ratios.

The polymerization reaction of 5(6)-amino-2-(p-aminophenyl) benzimidazole, aromatic diamine, and aromatic dichloride can be accomplished by means known in the art. See, for example, PCT Patent Application No. 2005/054337 and U.S. Patent Application No. 2010/0029159. Typically, one or more acid chloride(s) and one or more aromatic diamine(s) are reacted in an amide polar solvent such as N,N-dimethylformamide, N,N-dimethylacetamide, N-methyl-2-pyrrolidone, dimethylimidazolidinone and the like. N-methyl-2-pyrrolidone is preferred in some embodiments.

In some embodiments, before or during the polymerization, a solubility agent of an inorganic salt such as lithium chloride, or calcium chloride, or the like is added in a suitable amount to enhance the solubility of the resulting polymer in the amide polar solvent. After the desired degree of polymerization has been attained, the polymer is present in the form of an un-neutralized solid crumb. By "crumb" it is meant the polymer is in the form of a friable material or gel that easily separates into identifiable separate masses when sheared. The un-neutralized crumb includes the polymer, the polymerization solvent, the solubility agent and the byproduct acid from the condensation reaction, typically hydrochloric acid (HCl). In the presence of the HCl byproduct, the DAPBI residue in the polymer chain has the chemical structure of FIG. 3, wherein the imidazole is protonated.

After completing the polymerization reaction, the un-neutralized crumb can optionally be contacted with a base, which can be a basic inorganic compound, such as sodium hydroxide, potassium hydroxide, calcium hydroxide, calcium oxide, ammonium hydroxide, and the like. The basic inorganic compound can be used in aqueous solution to perform a neutralization reaction of HCl by-product. If desired, the basic compound can be an organic base such as diethyl amine or tributyl amine or other amines. Typically, the un-neutralized copolymer crumb is contacted with the aqueous base by washing, which converts acidic byproduct to a salt (generally a sodium chloride salt if sodium hydroxide is the base and HCl is the acidic byproduct) and also removes some of the polymerization solvent. If desired, the un-neutralized copolymer crumb can be optionally first washed one or more times with water prior to contacting with the basic inorganic compound to remove excess polymerization solvent. Once the acidic byproduct in the polymer crumb is neutralized, additional water washes can be employed to remove salt and polymerization solvent. After this washing, the DAPBI residue in the polymer chain has the chemical structure of FIG. 4, the imidazole being in a neutralized state. In some embodiments, the films are cast from polymer solutions wherein the imidazole is in a neutralized state.

Molecular weights of polymers are typically monitored by, and correlated to, one or more dilute solution viscosity measurements. Accordingly, dilute solution measurements of the relative viscosity ("$V_{rel}$" or "$\eta_{rel}$" or "$\eta_{rel}$") and inherent viscosity ("$V_{inh}$" or "$\eta_{inh}$" or "$\eta_{inh}$") are typically used for monitoring polymer molecular weight. The relative and inherent viscosities of dilute polymer solutions are related according to the expression $$V_{inh}=\ln(V_{rel})/C,$$

where ln is the natural logarithm function and C is the concentration of the polymer solution. $V_{rel}$ is a unitless ratio, thus $V_{inh}$ is expressed in units of inverse concentration, typically as deciliters per gram ("dl/g"). The polymer typically has an inherent viscosity of at least 3 dl/g, preferably at least 5 dl/g or higher. In some embodiments, the inherent viscosity can be 6 dl/g or greater.

The polymeric film comprising a polymer having residues of 5(6)-amino-2-(p-aminophenyl) benzimidazole, aromatic diamine, and aromatic diacid-chloride, can be made by a process comprising the steps of:

a) forming an isotropic casting solution comprising a polymer of 5(6)-amino-2-(p-aminophenyl) benzimidazole, aromatic diamine, and aromatic diacid-chloride in an organic solvent in the presence of a solubilizing salt, the isotropic casting solution having a polymer concentration of 1 to 5 weight percent, based on the total amount of polymer, solvent, and solubilizing salt in the isotropic casting solution, b) casting a layer of isotropic casting solution onto a surface to form a cast film, and c) removing solvent and solubilizing salt from the cast film.

In some embodiments, the isotropic casting solution of a) can be formed by solutioning a previously-made polymer crumb made from 5(6)-amino-2-(p-aminophenyl) benzimidazole, aromatic diamine, and aromatic diacid-chloride in a suitable organic solvent, the preferred solvent being DMAc. In other words, in this embodiment, it is preferred 5(6)-amino-2-(p-aminophenyl) benzimidazole, paraphenylenediamine, and terephthaloyl dichloride be polymerized at a high solids content (7 weight percent or greater) in $NMP/CaCl_2$) or $DMAC/CaCl_2$), followed by isolating and optionally washing the polymer crumb, which is then solutioned in an organic solvent to form a low-solids isotropic casting solution. In some instances, the use of polymer crumb in which the byproduct HCl has been neutralized can reduce bubble formation if the polymer is later solutioned in a strong acid like sulfuric acid. However, neutralization of the polymer crumb is optional. Preferably, the polymer is cast from a polymer solution that does not leave sulfur residue in the film; that is, the final film has at most only trace amounts of sulfur (less than 0.05 weight percent sulfur). Preferably, the film is made without contact with sulfuric acid or any other sulfur-containing compound.

In some other embodiments, the isotropic casting solution of a) can be formed by i) polymerizing 5(6)-amino-2-(p-aminophenyl) benzimidazole, aromatic diamine, and aromatic diacid-chloride in an organic solvent in the presence of a solubilizing salt to form a polymer solution, and ii) optionally adjusting the amount of solvent in the polymer solution, by either the addition or removal of solvent, to form an isotropic casting solution having a polymer concentration of 1 to 5 weight percent, based on the total amount of polymer, solvent, and solubilizing salt in the isotropic casting solution.

Regardless of the source of the polymer, the isotropic casting solution has a solids polymer concentration of 1 to 5 weight percent, based on the total amount of polymer, solvent, and solubilizing salt in the isotropic casting solution. It is believed that a polymer concentration of less than 1 weight percent requires more solvent than is normally desired or practical in a commercial process, while a polymer concentration of greater than 5 weight percent is at or near the upper limit of solubility of the polymer in DMAc, risking the formation of undesirable gel which is difficult to cast into a film. In one preferred embodiment, the isotropic casting solution has a polymer concentration of 2 to 4 weight percent, based on the amount of polymer, solvent, and solubilizing agent in the isotropic casting solution. In some preferred embodiments, the isotropic casting solution is made by solutioning the polymer in a $DMAc/CaCl_2$) or DMAc/LiCl solvent system wherein the solubilizing agent ($CaCl_2$ or LiCl) has concentration of 0.5 weight percent or greater in the solvent system. In some embodiments, a solubilizing agent concentration of 1.5 weight percent or greater in the solvent system is desirable. In some embodiments, the concentration of the solubilizing salt in the solvent system is 2 to 5 weight percent.

The isotropic casting solution may further contain additives such as anti-oxidants, lubricants, ultra-violet screening agents, colorants and the like.

The step a) of formation of the isotropic casting solution is then followed by a step b) of casting a layer of isotropic casting solution onto a surface to form a film. The casting of the isotropic casting solution to make a film can be accomplished by a number of processes. For example, films can be made by casting the casting solution onto a polished metal surface and calendering. In some methods, the film can be continuously made by casting, via for example, a film-casting die or doctor blade, or casting the solution onto a surface such as a belt or a rotating roll (or on a glass plate), and then optionally additionally doctoring the cast solution to create a cast film of desired or uniform thickness on a surface.

Once the cast film is made, solvent and solubilizing salt is removed from the cast film, the step including washing the film with an aqueous base wash solution to deprotonate the imidazole in a step c).

There are many ways to remove solvent and solubilizing salt from the film; however, the method and rate of removal of the solvent can determine the structure of the final film. For commercial production, the rate of solvent removal needs to be as fast as practical without damaging the film. If the solvent is removed too rapidly, voids will be created in the film, and flaws and actual pinholes can be formed. These flaws and holes can reduce the tenacity of the film and/or lower the breakdown voltage of the film.

The rate of solvent and solubilizing salt removal is dependent such things as the amount of solvent and solubilizing salt present, the thickness of the films, and the driving force imposed on the film. It has been found that if one desires a mostly transparent or clear film, it is desirable to control the rate of solvent removal in step c) to avoid creating voids in the film, which will result in objectionable opaqueness. The rate of solvent removal can be controlled, by example, by removing the solvent in more than one step, wherein the driving force in any one step does not create voids in the film.

The neat films typically have a golden color. Specifically, on the L*, a*, b* scale, approximate coloration values for the films fit within the following ranges: L* (88-92); a* (−7 to −11); b* (23-37). Additionally, it has been found that by controlling the removal of the solvent, such as by removing the solvent in more than one step, a clear or transparent (non-hazy) film can be made of golden color. The clear or transparent (non-hazy) films typically have a D65/10 haze percent, as measured according to ASTM D1003 Section 8, Procedure B, of 5 percent or less, preferably 2 percent or less. Lower numbers indicate lower haze or higher transparency than higher numbers.

Additionally, it can be advantageous to restrain the cast film during removal of the solvent in step c); for example, using a frame that sandwiches the cast film between the frame and a surface, to prevent shrinkage of the film during this step.

The solvent and solubilizing salt removal from the cast film of step c) can be accomplished by a number of processes. The solvent and solubilizing salt can be removed from the cast film by washing the film with an aqueous liquid in one or more stages, or by using a combination of washing and drying steps, with each of the washing and drying steps comprising one or more stages.

The solvent and solubilizing salt can be removed from the cast polymeric film in step c) by washing the cast film by submerging the cast polymeric film in a one or more aqueous baths and/or applying aqueous liquid to the films surface with various applicators (spray bar, trough, etc.), preferably in a countercurrent washing process using water, with each stage having increasingly dilute solvent solutions (increasingly less solvent in the wash water).

Alternatively, the solvent can be removed from the cast polymeric film in step c) in a drying step that exposes the film to heat to drive the solvent from the film. In the drying step, the cast film can be exposed to heat in an oven or to a heated gas in a plenum chamber, each providing energy to strip solvent from the cast film.

Regardless whether the solvent is removed via washing or by the application of heat, the solvent removal from the cast film can be accomplished over a wide range of temperatures, depending on how fast one needs to remove the solvent. For example, in an embodiment of a washing process, the solvent can be removed by exposing the cast film to a temperature ranging from room temperature (20° C.) or slightly higher up to the boiling point of the wash liquid.

Alternatively, in one embodiment, the solvent can be removed from the cast polymeric film by exposing the cast film to a drying step maintained at a temperature of about 35 to 280° C. In some embodiments the drying step is maintained at a temperature of 80 to 150° C. In other embodiments, it may be desirable for the drying step to be conducted at a temperature of 35 to 80° C.; or to conduct the drying in a plurality of stages, with each stage having a temperature that is higher than the prior stage.

If a drying stage is used to remove solvent, the process should additionally include a washing step to remove any solubilizing salt left behind, as the salt is not desirable in the final film.

It has been found that one particularly useful process for making the film utilizes a step c) that includes the steps of:

c-1) removing at least a portion of the solvent from the cast film with heat to form an intermediary film, c-2) rinsing the intermediary film with water in a second washing step, and c-3) further removing liquid from the intermediary film in a tensioned drying step, wherein the intermediary film is restrained from shrinking, to form a film.

The step c-1) can be conducted as described previously; that is, the solvent can be removed from the cast polymeric film by exposing the cast film to a drying step maintained at a temperature of about 35 to 280° C. In some embodiments the drying step is maintained at a temperature of 80 to 150° C. In other embodiments, it may be desirable for the drying step to be conducted at a temperature of 35 to 80° C.; or to conduct the drying in a plurality of stages, with each stage has a temperature that is higher than the prior stage.

Step c-1) is then followed by step c-2) of rinsing the intermediary film, generally by the use of aqueous liquid as the rinsing liquid. It is believed the rinsing liquid can be effective over a wide temperature range; the rinsing liquid can have a temperature ranging from room temperature (20° C.) or slightly higher up to the boiling point of the rinsing liquid. In some embodiments the rinsing liquid is maintained at a temperature of 80 to 150° C. In other embodiments, it may be desirable for the rinsing liquid to have a temperature of 35 to 80° C.

The amount of this washing is determined by the process being used. If the desire is to simply remove solubilizing salt, the amount of washing is determined by the desired amount of residual solubilizing salt that will be left in the intermediary film after washing.

Since the result of step c-2) is a wet film, step c-3) then follows to remove liquid from the washed intermediary film in a tensioned drying step, wherein the intermediary film is restrained from shrinking, while being exposed to a temperature ranging from room temperature (20° C.) to 280° C. to form a final film. In some embodiments, it may be desirable to expose the intermediary film in this tensioned drying step to a temperature of 80 to 150° C. In other embodiments, it may be desirable to expose the intermediary film to a temperature of 35 to 80° C. in this tensioned drying step. In the tensioned drying step, the intermediary film can be, for example, exposed to heat in an oven or to a heated gas in a plenum chamber.

If desired, after or during step c-3), the process for making a polymeric film can further include an optional step wherein the film is additionally mechanically stretched either axially or biaxially. In some embodiments the film is stretched a stretching ratio cross-sectional area of the film is stretched axially or in one direction 1.2 to 8.0 percent, preferably 1.2 to 4 percent; in some other embodiments the film is stretched biaxially 1.2 to 8.0 percent in both directions, preferably 1.2 to 4 percent in both directions.

Neat polymeric films having an increased dielectric constant comprising polymer including residues or repeat units of 5(6)-amino-2-(p-aminophenyl) benzimidazole, wherein the imidazole is in a deprotonated state as depicted in FIG. 5, can be made by washing the film in step c), using any of the steps as described herein, with an aqueous base wash solution to deprotonate the imidazole and form a polymer film having a polymer chain including a polymeric imidazole salt with the cation (C+) being determined by the type of base, e.g., sodium hydroxide, potassium hydroxide, calcium hydroxide, etc. The aqueous base wash solution should have a pH of 13.8 or greater. Preferably the aqueous base wash solution has a pH of 14; the aqueous base preferably being an aqueous solution comprising sodium hydroxide, potassium hydroxide, calcium hydroxide, or mixtures thereof. Such suitable base wash solutions having a pH of 13.8 or greater can be made by solutioning an appropriate amount of base in water. The wash solution should contact the film for a time sufficient to achieve the desired chemical structure, that is, to deprotonate one of the benzimidazole nitrogens such that the benzimidazole is in a deprotonated state, to form a benzimidazolide salt with a sodium, potassium, or calcium cation. Preferably, one of the nitrogens on at least 90 percent of the imidazole residue repeat units in the polymer are deprotonated, and most preferably one of the nitrogens on at least 95 percent of the imidazole residue repeat units in the polymer are deprotonated, the anion providing the negative charge (−) to the salt, while some other species is the cation providing the positive charge (C+) to the salt.

Specifically, at least 90 percent, and preferably at least 95 percent of the DAPBI residue repeat units in the polymer are a salt having a structure as shown in FIG. 5.

The films have use in electronic devices requiring higher frequencies, lower voltages, and larger currents, specifically applications needing smaller forms and lower cost. It is believed the films can provide improved electrical performance in devices, including reduced board size. The films have particular use in embedded capacitance applications as well as slot liners.

Test Methods

The dielectric constant (relative permittivity or dK) and the dissipation factor (Df or tan delta) were determined at 2 to 10 GHz (or the provided frequency) using a rectangular cavity resonator according to ASTM 2520C, IPC-TM-650 2.5.5.3.

The capacitance of the films was determined by a Hioki IM3536 LCR meter using the method supplied with the meter.

The breakdown voltage of the films was determined according to ASTM D-149.

The film thickness was measured using a Solartron® thickness gauge Model no. DR600.

The film tensile properties (film tenacity, modulus, and elongation-at-break) were measured according to ASTM D-882.

Film color and transparency (haze) was determined using a Hunter Lab UltraScan® Vis spectrophotometer with Easy-Match® QC and Sensor Manager and ColorCalculator® software, following the ASTM D1003 Section 8, Procedure B. The International Commission on Illumination (CIE) positions D65 as the standard daylight illuminant. The observer angle is measured at 10 degrees to result in the designation of "D65/10" haze. Lower numbers indicate lower haze or higher transparency than higher haze numbers.

Example 1

A polymer was made as follows. The monomers 5(6)-amino-2-(p-aminophenyl) benzimidazole (DAPBI) and paraphenylene diamine (PPD), in amounts suitable for forming a copolymer having a DABPI/PPD monomer ratio of 70/30, were combined with a stoichiometric amount of terephthaloyl dichloride (TCI) in a solvent system comprising N-methyl-2-pyrrolidone (NMP) solvent and 4.5 weight percent calcium chloride ($CaCl_2$) as a solubility enhancer. The monomers polymerized to form a copolymer. After the polymerization was complete, the copolymer crumb was recovered, ground, and washed with sodium hydroxide to neutralize byproduct hydrochloric acid. The crumb was then filtered and dried. The copolymer that had an inherent viscosity of about 6.4 dl/g.

A polymer solution was then made from the dried polymer crumb by mixing 3 weight percent polymer, 3 weight percent $CaCl_2$ solubility enhancer, 2 weight percent water, and 92 weight percent dimethyl acetamide (DMAc).

Approximately 6" by 8" films were cast onto glass plates using a doctor blade that was equipped with micrometer set to approximately 20 times the target dry thickness. The glass plates with cast films were then set in an oven operating at 100 to 120° C. until approximately 50% of the DMAc was removed.

For a first Control film, a sample of the partially-dried unwashed film on glass was placed into a first wash bath containing 3 liters of water for 30 minutes. For a Comparison benzimidazolium salt film, a sample of the partially-dried unwashed film on glass was placed into a first wash bath containing 3 liters of water adjusted with HCl to a pH of 3. For an Inventive Example benzimidazolide film, the film on glass was placed into a first wash bath containing 3 liters of water adjusted with NaOH to a pH of 14. Each of the sample samples were loosened from the glass and placed into individual second and third water wash baths for one hour each; each wash bath containing 1 liter water. Each wet film was placed on a tensioning frame and constrained in the frame while the films were dried an oven operating at 100° C. for one hour. The films were allowed to cool to room temperature before removing them from the frame. The chloride level in the control film was measured to below 100 ppm. In a similar manner, a second Control film was made from a copolymer having a DAPBI/PPD monomer ratio of 50/50, using a polymer solution having 2 weight percent polymer, 6 weight percent $CaCl_2$), 2 weight percent water, and 90 weight percent DMAc. The thickness and dielectric constant were then determined for each film sample at 68-69 degree F. and 40-42 relative humidity. The data are summarized in Tables 1 and 2 and FIG. 2.

As can be seen from the figure and tables, the inventive benzimidazolide film samples (Benzimidazolide Example) had higher dielectric constants than the Controls or benzimidazolium salt film samples (Benzimidazolium Salt Comparison). It was unexpected that the dielectric constant of the film could be modified by changing the state of the imidazole group in the polymeric film. In the case of the Comparison Examples with the imidazole being in the protonated state, the dielectric constant was reduced by 0.5 versus the control; while when the imidazole is in the deprotonated state as in the Inventive Examples, the dielectric constant increased an entire unit over the control. This effect is useful for to tailor the dielectric constant for applications that require low dK or high dK. As can be seen from the control examples, the relative amounts of monomers do not seem to have a significant impact on dielectric constant while the state of the imidazole group does.

Table 3 summarizes the percent difference in dielectric constant from the Control samples for both the Inventive Benzimidazolide Examples and the Comparison Benzimidazolium Salt Examples, illustrating the unexpectantly large increase in dielectric constant for the inventive examples. The Inventive Benzimidazolide Examples showed a consistently increased in dK of 16 to 20 percent over the control samples, while the Comparison Benzimidazolium Salt Examples had dK values that were consistently less than the Control Samples.

TABLE 1

| | Thickness | Thickness Std. Dev. | Dielectric Constant (dK) (at GHz) | | | | | |
|---|---|---|---|---|---|---|---|---|
| Item | (microns) | (microns) | 2.2 | 3.4 | 5.0 | 6.8 | 8.7 | 10.4 |
| Control (70/30) | 13.4 | 1.8 | 4.64 | 4.59 | 4.55 | 4.52 | 4.49 | 4.47 |
| Benzimidazolium Salt Comparison (70/30) | 13.3 | 2.2 | 4.20 | 4.18 | 4.15 | 4.12 | 4.09 | 4.07 |
| Benzimidazolide Inventive Example (70/30) | 14.7 | 3.6 | 5.40 | 5.48 | 5.47 | 5.43 | 5.36 | 5.29 |
| Control (50/50) | 8.1 | 1.6 | 4.61 | 4.61 | 4.57 | 4.53 | 4.49 | 4.45 |

TABLE 2

| | Dissipation Factor (dF) (at GHz) | | | | | |
|---|---|---|---|---|---|---|
| Item | 2.2 | 3.4 | 5.0 | 6.8 | 8.7 | 10.4 |
| Control (70/30) | 0.0366 | 0.0357 | 0.0368 | 0.0379 | 0.0361 | 0.0362 |
| Comparison (Benzimidazolium Salt) (70/30) | 0.0376 | 0.0383 | 0.0390 | 0.0404 | 0.0384 | 0.0383 |
| Inventive (Benzimidazolide) (70/30) | 0.0364 | 0.0365 | 0.0368 | 0.0382 | 0.0361 | 0.0359 |
| Control (50/50) | 0.0343 | 0.0361 | 0.0372 | 0.0383 | 0.0362 | 0.0365 |

TABLE 3

| | Percent Change in Dielectric Constant (dK) (per GHz) | | | | | |
|---|---|---|---|---|---|---|
| Item | 2.2 | 3.4 | 5.0 | 6.8 | 8.7 | 10.4 |
| Inventive (Benzimidazolide) (70/30) | 16 | 19 | 20 | 20 | 19 | 18 |
| Comparison (Benzimidazolium Salt) (70/30) | (9) | (9) | (9) | (9) | (9) | (9) |

The invention claimed is:

1. A polymeric film comprising residues of 5(6)-amino-2-(p-aminophenyl) benzimidazole, aromatic diamine, and aromatic diacid-chloride, in the form of polymer having a polymer chain including a salt of formula I, wherein C+ is a sodium, potassium, or calcium cation,

I

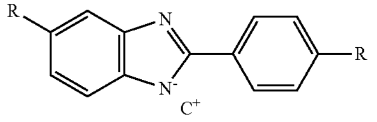

the film having a thickness of about 1 to 50 micrometers, and a dielectric constant of 4.5 or greater at 2 GHz in the absence of any particulate additives that increase the dielectric constant of the film.

2. The polymeric film of claim 1, wherein the dielectric constant is 5.0 to 6.0 at 2 GHz.

3. The polymeric film of claim 1 having a thickness of about 1 to 12 micrometers.

4. The polymeric film of claim 1, wherein the aromatic diamine is paraphenylenediamine.

5. The polymeric film of claim 1, wherein the aromatic diacid-chloride is terephthaloyl dichloride.

6. The polymeric film of claim 1 having a molar ratio of 5(6)-amino-2-(p-aminophenyl) benzimidazole to aromatic diamine of 30/70 to 85/15.

7. The polymeric film of claim 6 having a molar ratio of 5(6)-amino-2-(p-aminophenyl) benzimidazole to aromatic diamine of 45/55 to 85/15.

8. The polymeric film of claim 1, wherein 5(6)-amino-2-(p-aminophenyl) benzimidazole is 50 mole percent or greater of the total moles of 5(6)-amino-2-(p-aminophenyl) benzimidazole and aromatic diamine present.

9. The polymeric film of claim 1, wherein at least 90% of the imidazole residue repeat units in the polymer are a salt of formula I.

* * * * *